United States Patent
Choi (10) Patent No.: US 9,435,296 B2
(45) Date of Patent: Sep. 6, 2016

(54) ENGINE SYSTEM HAVING TURBOCHARGER

(71) Applicant: Hyundai Motor Company, Seoul (KR)

(72) Inventor: Won Rok Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 73 days.

(21) Appl. No.: 14/488,868

(22) Filed: Sep. 17, 2014

(65) Prior Publication Data

US 2015/0159593 A1   Jun. 11, 2015

(30) Foreign Application Priority Data

Dec. 6, 2013   (KR) .......................... 10-2013-0151791

(51) Int. Cl.
*F02B 33/44*   (2006.01)
*F02B 29/04*   (2006.01)
*F02M 25/07*   (2006.01)

(52) U.S. Cl.
CPC ......... *F02M 25/0726* (2013.01); *Y02T 10/121* (2013.01); *Y02T 10/146* (2013.01)

(58) Field of Classification Search
CPC  F02B 29/0462; F02B 29/0437; F02B 37/00; F02M 25/0707; F02M 25/0726
USPC .............. 60/605.2, 599; 123/562.12, 568.12
See application file for complete search history.

(56) References Cited

U.S. PATENT DOCUMENTS

| | | | |
|---|---|---|---|
| 6,116,026 A * | 9/2000 | Freese, V ..................... | 60/605.2 |
| 7,089,890 B2 * | 8/2006 | Obidi ......................... | 123/41.31 |
| 7,237,513 B2 * | 7/2007 | Pfeffinger et al. ......... | 123/41.29 |
| 7,721,543 B2 * | 5/2010 | Massey et al. ............. | 60/605.2 |
| 7,921,829 B2 * | 4/2011 | Hayashi .................... | 123/568.12 |
| 8,813,730 B2 * | 8/2014 | Korenaga et al. ........ | 123/568.12 |
| 2008/0264609 A1 * | 10/2008 | Lutz et al. ................ | 165/104.19 |
| 2009/0314266 A1 * | 12/2009 | Hori et al. ................ | 123/568.12 |
| 2010/0224142 A1 * | 9/2010 | Iwamoto et al. .............. | 60/301 |
| 2011/0023796 A1 * | 2/2011 | Cattani et al. ............ | 123/568.12 |
| 2011/0041814 A1 * | 2/2011 | Kardos et al. ................ | 123/563 |
| 2011/0125361 A1 * | 5/2011 | Weber et al. .............. | 123/41.01 |
| 2013/0213367 A1 * | 8/2013 | Grosch et al. ................ | 123/563 |
| 2014/0245735 A1 * | 9/2014 | Kuske et al. .................... | 60/599 |

(Continued)

FOREIGN PATENT DOCUMENTS

DE   102004032777 A1 *   7/2005   .......... F02B 29/0418
DE   102010006309 A1 *   7/2011   .............. F02B 37/00

(Continued)

*Primary Examiner* — Thai Ba Trieu
(74) *Attorney, Agent, or Firm* — Morgan, Lewis & Bockius LLP (57) ABSTRACT

An engine system having a turbocharger may include a cylinder head at which an intake manifold and an exhaust manifold may be placed, the turbocharger connected to the exhaust manifold to compress intake air by a first exhaust gas exhausted from the exhaust manifold, an intake line that may be formed between the turbocharger and the intake manifold through the cylinder head to deliver a compressed air compressed by the turbocharger, an intercooler placed between the intake line and the intake manifold to cool the compressed air, an Exhaust Gas Recirculation (EGR) line that recirculates a second exhaust gas that may be exhausted from the exhaust manifold to the intake manifold, and an EGR cooler that may be placed between the EGR line and the intake manifold to cool an EGR gas, wherein a low temperature coolant passing through the cylinder head cools the compressed air.

9 Claims, 6 Drawing Sheets

(56) References Cited

U.S. PATENT DOCUMENTS

| | | | |
|---|---|---|---|
| 2014/0374498 A1* | 12/2014 | Quix et al. | 237/12.3 R |
| 2015/0107566 A1* | 4/2015 | Sugiyama et al. | 123/568.12 |
| 2015/0159542 A1* | 6/2015 | Choi | F02M 25/0706 |
| 2015/0159592 A1* | 6/2015 | Choi | F02M 25/0706 |
| 2015/0167595 A1* | 6/2015 | Choi | F02M 25/0706 |

FOREIGN PATENT DOCUMENTS

| | | | | |
|---|---|---|---|---|
| DE | 102011013029 A1 * | 9/2011 | | F02M 25/07 |
| EP | 1908951 A1 * | 4/2008 | | F02M 25/07 |
| GB | 2416001 A * | 1/2006 | | F02B 29/0406 |
| JP | 09-280118 (A) | 10/1997 | | |
| JP | 2005-2983 A | 1/2005 | | |
| JP | 2011132852 A * | 7/2011 | | F02M 25/07 |
| JP | 2011-190742 (A) | 9/2011 | | |
| JP | 2011-190744 A | 9/2011 | | |
| JP | 2013-104314 A | 5/2013 | | |
| KR | 10-2003-0015478 (A) | 2/2003 | | |
| KR | 10-2011-0064054 A | 6/2011 | | |
| WO | WO 2004044401 A1 * | 5/2004 | | F02B 29/04 |

* cited by examiner

FIG. 1

← - - - EGR gas
← - · - Compressed air
← —— Low temperature coolant

(Prior Art)

ENGINE SYSTEM HAVING TURBOCHARGER

CROSS-REFERENCE TO RELATED APPLICATION

The present application claims priority to and the benefit of Korean Patent Application No. 10-2013-0151791 filed on Dec. 6, 2013, the entire contents of which is incorporated herein for all purposes by this reference.

BACKGROUND OF THE INVENTION

1. Field of the Invention

The present invention is related to an engine system having a turbocharger that is used to improve output, combustion efficiency, and quality of exhaust gas in a low speed area.

2. Description of Related Art

Generally, a diesel engine has been known to have low fuel consumption and good efficiency, as compared to a gasoline engine. Its efficiency is about 40%, and this can be realized by a high compression ratio.

Recently, a turbocharger and an intercooler have been mounted on the engine so as to achieve higher output.

The engine having the turbocharger sucks outside air and uses exhaust gas to compress it, and the compressed air is supplied to a combustion chamber of the engine.

However, the air that is rapidly compressed absorbs heat that is generated during the compression process or heat of the turbocharger so that the density thereof is decreased, and resultantly charging efficiency inside an engine combustion chamber is deteriorated.

Thus, an intercooler is used to cool the compressed air so that the density of compressed air is increased, and resultantly a larger amount of air is supplied to an engine combustion chamber so that high output can be obtained.

Meanwhile, an intercooler is disposed on a middle part of an intake line, so the length of the intake line that is formed from the intercooler to an intake manifold is increased to deteriorate responsiveness and efficiency of the intercooler. Further, because the intercooler is disposed together with an Exhaust Gas Recirculation (EGR) cooler, cooling load is increased and overall cooling efficiency and performance can be deteriorated.

Figure 6:
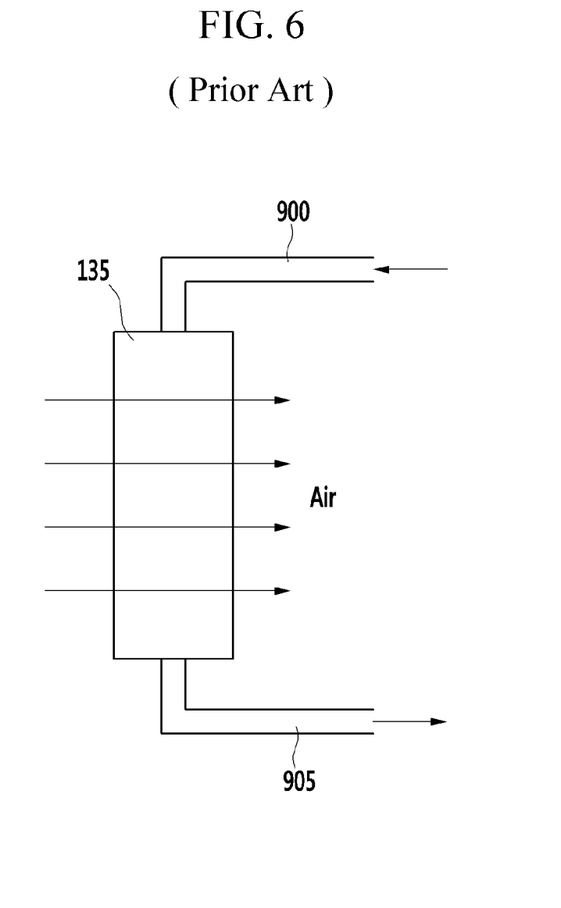
FIG. 6 is a schematic diagram of a conventional engine having an intercooler.

FIG. 6 is a schematic diagram of a conventional engine having an intercooler. Referring to the FIG. 6, an inlet duct 900 is connected to one side of an intercooler 135, and an outlet duct 905 is connected to the other side of the intercooler 135.

Intake air passes the inlet duct 900, the intercooler 135, and the outlet duct 905 to be supplied to a combustion chamber of an engine, the intake air is cooled by outside air that passes the intercooler 135. Meanwhile, the intake air is cooled by the outside air, the cooling performance can be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system having a turbocharger having advantages of stably cooling high temperature compressed air that is compressed by a turbocharger, decreasing capacity of a water-cooled intercooler, simultaneously improving cooling efficiency, performance, and responsiveness of a turbocharger, and stably cooling EGR gas.

An engine system having a turbocharger, may include a cylinder head at which an intake manifold and an exhaust manifold are placed, the turbocharger that is connected to the exhaust manifold and compresses intake air by a first exhaust gas that is exhausted from the exhaust manifold, an intake line that is formed between the turbocharger and the intake manifold through the cylinder head to deliver a compressed air that is compressed by the turbocharger, an intercooler that is placed between the intake line and the intake manifold to cool the compressed air, an Exhaust Gas Recirculation (EGR) line that recirculates a second exhaust gas that is exhausted from the exhaust manifold to the intake manifold, and an EGR cooler that is placed between the EGR line and the intake manifold to cool an EGR gas, wherein a low temperature coolant passing through the cylinder head cools the compressed air.

The intercooler and the EGR cooler are water cooled types that cool the compressed air by the low temperature coolant circulating through a low temperature coolant line that is different from an engine coolant line that cools the cylinder head.

The low temperature coolant line passes through the cylinder head to cool the compressed air flowing through the cylinder head via the intake line, then sequentially passes through the intercooler and the EGR cooler, and circulates through a low temperature radiator and a low temperature pump mounted on the low temperature coolant line.

The intercooler and the EGR cooler are combined with the intake manifold.

The intercooler is combined with the EGR cooler.

The EGR gas that is cooled by the EGR cooler is mixed with the intake air that is cooled by the intercooler in the intake manifold.

The low temperature coolant line passes through the intercooler and the EGR cooler, then passes through the cylinder head to cool the compressed air passing through the cylinder head via the intake line, and circulates through a low temperature pump and a low temperature radiator mounted on the low temperature coolant line.

A compressed air passage penetrating the cylinder head may have a cylindrical shape corresponding to the intake line and connected thereto, and a low temperature coolant passage is formed around the compressed air passage and connected to a low temperature coolant line to supply the low temperature coolant.

In accordance with the present invention for realizing the object, an intake line does not detour around a cylinder head but penetrates the cylinder head, thus the length of the intake line is decreased and the compressed air is cooled by low temperature coolant passing through the cylinder head to be able to decrease the load and the capacity of the intercooler.

Also, an EGR cooler, an intercooler, and an intake manifold are combined with each other such that the length of a low temperature coolant line is decreased, overall cooling efficiency is increased, the number of components is decreased, and productivity is improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
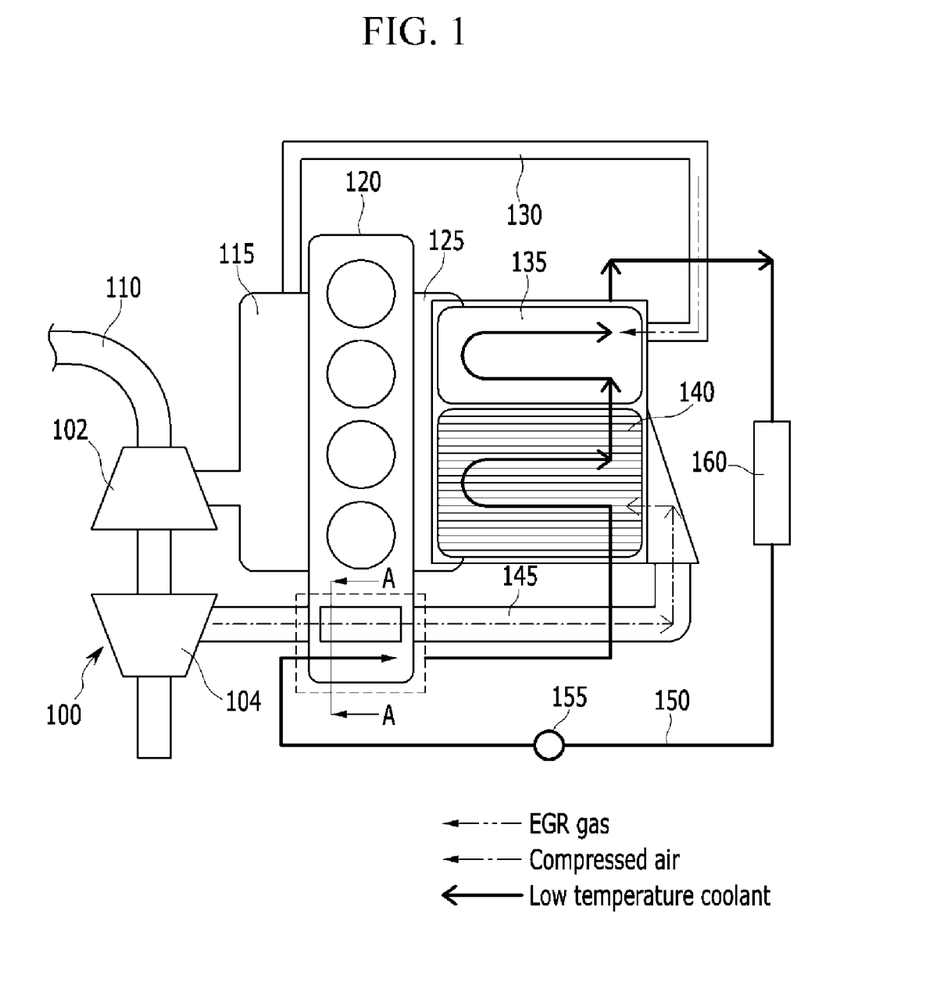
FIG. 1 is a schematic diagram of an engine system having a turbocharger according to an exemplary embodiment of the present invention.

FIG. 1 is a schematic diagram of an engine system having a turbocharger according to an exemplary embodiment of the present invention.

Referring to FIG. 1, an engine system having a turbocharger includes a turbocharger 100 having a turbine 102 and a compressor 104, an exhaust line 110, an exhaust manifold 115, a cylinder head 120, an intake manifold 125, an EGR line 130, an EGR cooler 135, an intercooler 140, a low temperature radiator 160, a low temperature coolant line 150, a low temperature pump 155, and an intake line 145.

Intake air is compressed by the compressor 104 of the turbocharger 100 to be supplied to a combustion chamber of the cylinder head 120 through the intake line 145, the intercooler 140, and the intake manifold 125.

Further, combustion gas that is combusted in the combustion chamber is exhausted to the outside through the exhaust manifold 115, the turbine 102 of the turbocharger 100, and the exhaust line 110.

The intake line 145 penetrates one side of the cylinder head 120. Accordingly, the compressed gas that is compressed by the compressor 104 penetrates the cylinder head 120 to be firstly cooled by low temperature coolant, and is secondly cooled by the intercooler.

The low temperature coolant circulates through a low temperature coolant line 150 that is different from an engine coolant line through which engine coolant circulates through the cylinder head 120, and the engine coolant circulates through an engine coolant line that is separately formed from the low temperature coolant line 150.

The EGR cooler 135 is combined with the intercooler 140, and the EGR line 130 is formed from the exhaust manifold 115 to the EGR cooler 135.

The exhaust gas that is recirculated through the EGR line 130 is cooled by the EGR cooler 135 and is mixed with intake air in the intake manifold 125. Further, the EGR cooler 135 and the intercooler 140 are combined with the intake manifold 125.

The low temperature coolant line is formed along the low temperature pump, the cylinder head, the intercooler, the EGR cooler, and the low temperature radiator.

The low temperature coolant firstly cools compressed gas passing the through the cylinder head 120, secondly cools the compressed gas passing through the intercooler 140, and thirdly cools EGR gas passing through the EGR cooler 135.

The low temperature radiator 160 cools heated low temperature coolant, and the low temperature pump 155 is a motorized type that circulates the low temperature coolant. Here, rotation speed and pumping load of the low temperature pump 155 can be controlled and it can be turned off by a control portion while the engine is being operated.

In an exemplary embodiment of the present invention, because the intake line 145 does not detour the cylinder head 120 and penetrates the cylinder head 120, the length of the intake line 145 is decreased and compressed air is firstly cooled by the low temperature coolant passing through the cylinder head 120 such that load and capacity of the intercooler 140 can be reduced.

Also, the EGR cooler 135, the intercooler 140, and the intake manifold 125 are combined with each other such that the length of the low temperature coolant line 150 is reduced, cooling efficiency is increased, and productivity is improved.

Figure 2:
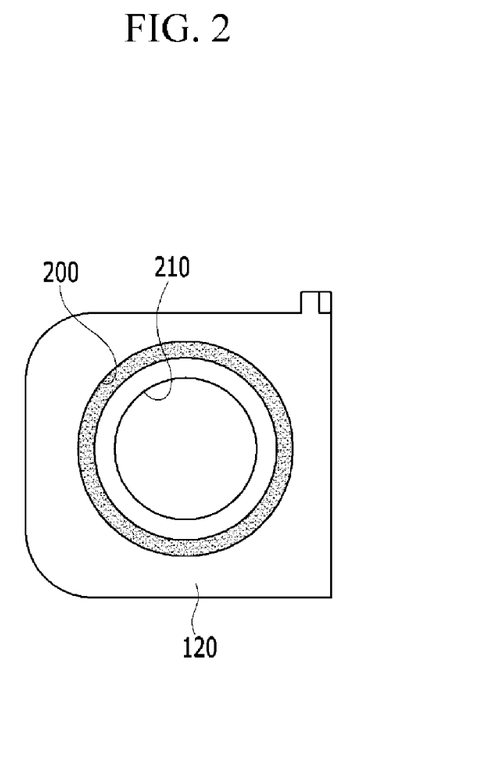
FIG. 2 is a schematic cross-sectional view along A-A line of FIG. 1.

FIG. 2 is a schematic cross-sectional view along A-A line of FIG. 1.

Referring to FIG. 2, a compressed air passage 210 through which compressed air flows is formed inside an edge of the cylinder head 120 to correspond to the intake line 145.

The cross-section of the compressed air passage 210 is circular, and a low temperature coolant passage 200 is formed around the low temperature coolant along the exterior circumference thereof. The low temperature coolant passage 200 has a circular pipe structure surrounding the compressed air passage 210.

Figure 3:
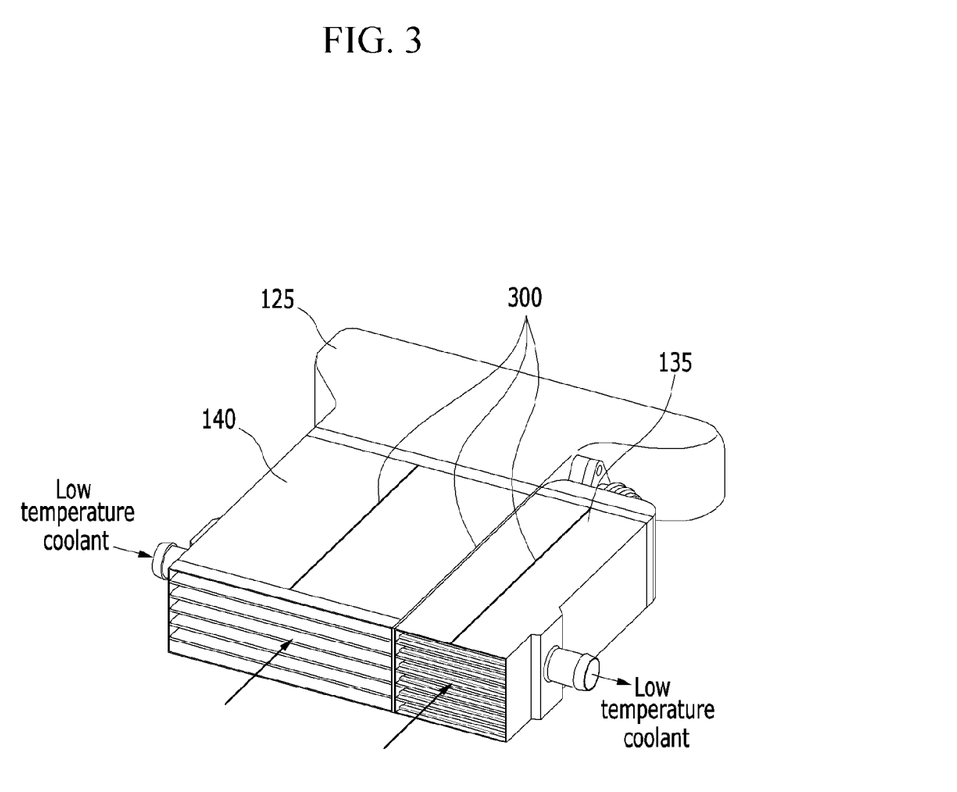
FIG. 3 is a partial perspective view of an engine system having a turbocharger according to an exemplary embodiment of the present invention.
Figure 4:
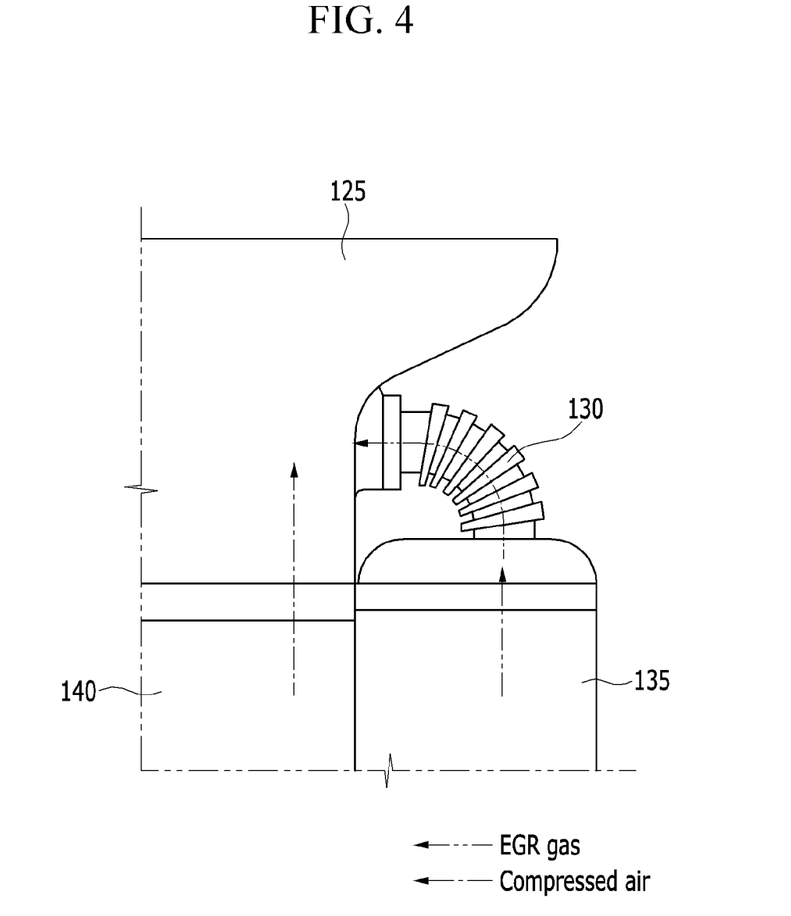
FIG. 4 is a partial top plan view of an engine system having a turbocharger according to an exemplary embodiment of the present invention.

FIG. 3 is a partial perspective view of an engine system having a turbocharger according to an exemplary embodiment of the present invention, and FIG. 4 is a partial top plan view of an engine system having a turbocharger according to an exemplary embodiment of the present invention.

Referring to FIG. 3, the intercooler 140 is combined with the EGR cooler 135 through a barrier 300, and the intercooler 140 is directly connected to the intake manifold 125.

Accordingly, the intake air that is exhausted from the intercooler 140 is supplied to the intake manifold 125, and the intake air that is exhausted from the EGR cooler 135 is supplied to the intake manifold 125. Further, the intake air and the EGR gas are mixed in the intake manifold 125 to be supplied to the combustion chamber.

Figure 5:
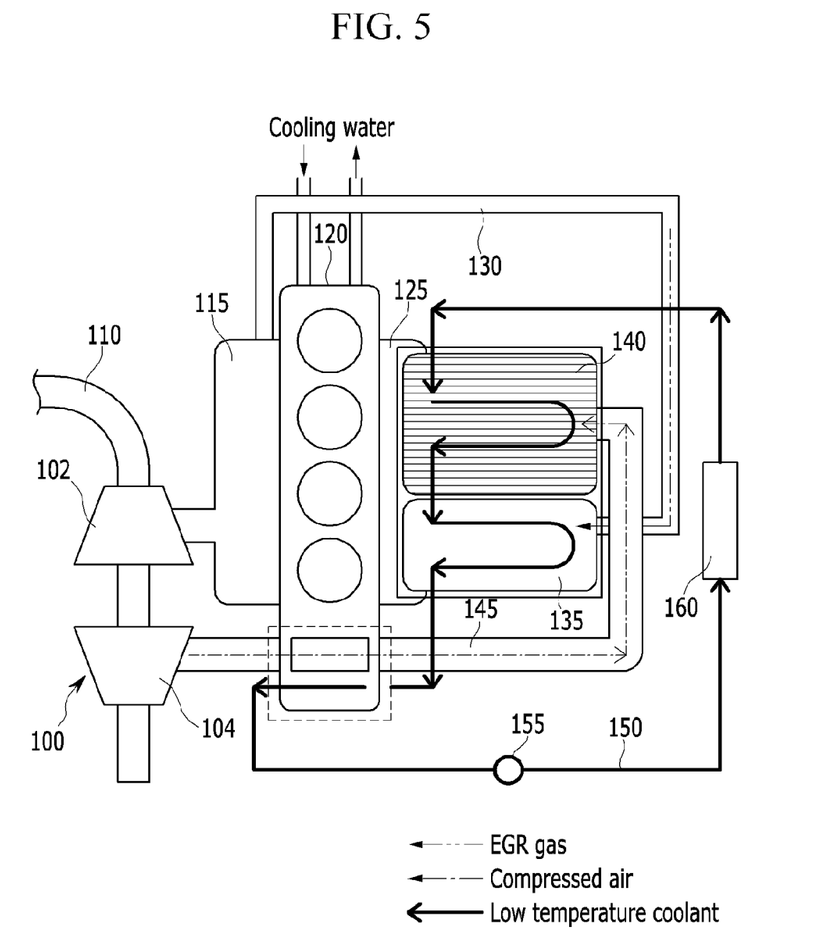
FIG. 5 is a schematic diagram of an engine system having a turbocharger according to another exemplary embodiment of the present invention.

FIG. 5 is a schematic diagram of an engine system having a turbocharger according to another exemplary embodiment of the present invention, and compared with FIG. 1, distinguished parts will be described, while the detailed description of the same or similar configurations is not provided.

Referring to FIG. 5, an engine system having a turbocharger includes a turbocharger 100 having a turbine 102 and a compressor 104, an exhaust line 110, an exhaust manifold 115, a cylinder head 120, an intake manifold 125, an EGR line 130, an EGR cooler 135, an intercooler 140, a low temperature radiator 160, a low temperature coolant line 150, a low temperature pump 155, and an intake line 145.

Low temperature coolant circulates the low temperature pump 155, the low temperature radiator 160, the intercooler 140, the EGR cooler 135 and the cylinder head 120. The circulation direction of the low temperature coolant is an opposite direction compared with that of FIG. 1, and the positions of the EGR cooler 135 and the intercooler 140 are changed.

Accordingly, the low temperature coolant passing the low temperature radiator 160 firstly cools intake air in the intercooler 140, secondly cools EGR gas in the EGR cooler 135, and thirdly cools compressed air in the cylinder head 120.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. An engine system having a turbocharger, comprising:
   a cylinder head at which an intake manifold and an exhaust manifold are placed;
   the turbocharger that is connected to the exhaust manifold and compresses intake air by a first exhaust gas that is exhausted from the exhaust manifold;
   an intake line that is formed between the turbocharger and the intake manifold through the cylinder head to deliver a compressed air that is compressed by the turbocharger;
   an intercooler that is placed between the intake line and the intake manifold to cool the compressed air;
   an Exhaust Gas Recirculation (EGR) line that recirculates a second exhaust gas that is exhausted from the exhaust manifold to the intake manifold; and
   an EGR cooler that is placed between the EGR line and the intake manifold to cool an EGR gas,
   wherein a low temperature coolant passing through the cylinder head cools the compressed air,
   wherein the intercooler and the EGR cooler are water cooled types that cool the compressed air by the low temperature coolant circulating through a low temperature coolant line that is different from an engine coolant line that cools the cylinder head, and
   wherein the low temperature coolant line passes through the intercooler and the EGR cooler, then passes through the cylinder head to cool the compressed air passing through the cylinder head via the intake line, and circulates through a low temperature pump and a low temperature radiator mounted on the low temperature coolant line.

2. The engine system having the turbocharger of claim 1, wherein the intercooler and the EGR cooler are combined with the intake manifold.

3. The engine system having the turbocharger of claim 2, wherein the intercooler is combined with the EGR cooler.

4. The engine system having the turbocharger of claim 2, wherein the EGR gas that is cooled by the EGR cooler is mixed with the intake air that is cooled by the intercooler in the intake manifold.

5. An engine system having a turbocharger, comprising:
   a cylinder head at which an intake manifold and an exhaust manifold are placed;
   the turbocharger that is connected to the exhaust manifold and compresses intake air by a first exhaust gas that is exhausted from the exhaust manifold;
   an intake line that is formed between the turbocharger and the intake manifold through the cylinder head to deliver a compressed air that is compressed by the turbocharger;
   an intercooler that is placed between the intake line and the intake manifold to cool the compressed air;
   an Exhaust Gas Recirculation (EGR) line that recirculates a second exhaust gas that is exhausted from the exhaust manifold to the intake manifold; and
   an EGR cooler that is placed between the EGR line and the intake manifold to cool an EGR gas,
   wherein a low temperature coolant passing through the cylinder head cools the compressed air,
   wherein the intercooler and the EGR cooler are water cooled types that cool the compressed air by the low temperature coolant circulating through a low temperature coolant line that is different from an engine coolant line that cools the cylinder head, and
   wherein a compressed air passage penetrating the cylinder head has a cylindrical shape corresponding to the intake line and connected thereto, and a low temperature coolant passage is formed around the compressed air passage and connected to the low temperature coolant line to supply the low temperature coolant.

6. The engine system having the turbocharger of claim 5, wherein the low temperature coolant line passes through the cylinder head to cool the compressed air flowing through the cylinder head via the intake line, then sequentially passes through the intercooler and the EGR cooler, and circulates through a low temperature radiator and a low temperature pump mounted on the low temperature coolant line.

7. The engine system having the turbocharger of claim 5, wherein the intercooler and the EGR cooler are combined with the intake manifold.

8. The engine system having the turbocharger of claim 7, wherein the intercooler is combined with the EGR cooler.

9. The engine system having the turbocharger of claim 7, wherein the EGR gas that is cooled by the EGR cooler is mixed with the intake air that is cooled by the intercooler in the intake manifold.

* * * * *